United States Patent
Ming et al.

(10) Patent No.: US 8,144,361 B2
(45) Date of Patent: Mar. 27, 2012

(54) CREATION AND PLACEMENT OF TWO-DIMENSIONAL BARCODE STAMPS ON PRINTED DOCUMENTS FOR STORING AUTHENTICATION INFORMATION

(75) Inventors: Wei Ming, Cupertino, CA (US); Maria Qian Zhao, San Pablo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1044 days.

(21) Appl. No.: 12/050,701

(22) Filed: Mar. 18, 2008

(65) Prior Publication Data

US 2009/0238625 A1      Sep. 24, 2009

(51) Int. Cl.
    *G06K 15/00* (2006.01)
(52) U.S. Cl. ........................ 358/1.18; 358/3.28; 382/176
(58) Field of Classification Search ................... 358/1.1, 358/3.28, 1.18, 462, 468; 382/173, 176, 382/306
    See application file for complete search history.

(56) References Cited

U.S. PATENT DOCUMENTS

| 6,873,435 | B1 * | 3/2005 | Tehranchi et al. | 358/1.9 |
| 7,164,500 | B2 * | 1/2007 | Bean et al. | 358/2.1 |
| 7,766,241 | B2 * | 8/2010 | Tomita | 235/462.11 |

\* cited by examiner

*Primary Examiner* — Thomas D Lee
(74) *Attorney, Agent, or Firm* — Chen Yoshimura LLP (57) ABSTRACT

A document authenticating method is disclosed by which numerous small-sized two-dimensional barcode stamps are generated and placed in a distributed manner on a printed document. The small-sized barcode stamps collectively encode the content of the document to be used for document authentication. In one example, the stamp size is about ¼ by ¼ inches or less and the tile size for the stamps is 4 by 4 pixels at a resolution of 400 dpi. The document is segmented into segments each containing a paragraph or a line of text. For each segment, a set of barcode stamps encoding the authentication data for the segment is placed in the vicinity of the segment. They may be placed in the empty space in the last line of each paragraph, in the empty space between adjacent paragraphs, or at the beginning or end of each line.

30 Claims, 6 Drawing Sheets

CREATION AND PLACEMENT OF TWO-DIMENSIONAL BARCODE STAMPS ON PRINTED DOCUMENTS FOR STORING AUTHENTICATION INFORMATION

CROSS REFERENCE TO RELATED APPLICATIONS

This application cross-references and incorporates by reference U.S. patent application Ser. No. 12/050,718, filed Mar. 18, 2008, entitled "Creation And Placement Of Two-Dimensional Barcode Stamps On Printed Documents For Storing Authentication Information".

BACKGROUND OF THE INVENTION

1. Field of the Invention

This invention relates to the application of two-dimensional barcode in document authentication, and in particular, it relates to the creation and placement of barcode stamps on printed documents.

2. Description of Related Art

Barcode is a form of machine-readable symbology for encoding data, and has been widely introduced in a variety of application fields. Two-dimensional barcode (2d barcode) is one mode of such symbology, and can be used to encode text, numbers, images, and binary data streams in general, and has been used in identification cards, shipping labels, certificates and other documents, etc. Examples of widely used 2d barcode standards include PDF417 standard and QR Code®, and software and hardware products have been available to print and read such 2d barcode.

Original digital documents, which may include text, graphics, images, etc., are often printed, and the printed hard copy are distributed, copied, etc., and then often scanned back into digital form. This is referred to a closed-loop process. Authenticating a scanned digital document refers to determining whether the scanned document is an authentic copy of the original digital document, i.e., whether the document has been altered while it was in the hard copy form. Alteration may occur due to deliberate effort or accidental events. Methods have been proposed to authenticate a printed document using 2d barcode. Specifically, the method includes encoding the content of the document in a 2d barcode (the authentication barcode), and printing the barcode on the same recording medium as the printed document. The content of the document may be a bitmap image of a page of the document, text or graphics contained within the document, or a mixture thereof. To authenticate a printed document bearing an authentication barcode, the document is scanned to obtain scanned data that represents the content of the document, e.g. a bitmap image, or text extracted by using an optical character recognition (OCR) technology. The authentication barcode is also scanned and the data contained therein (the authentication data) is extracted. The scanned data is then compared to the authentication data to determine if any part of the printed document has been altered since it was originally printed, i.e. whether the document is authentic. Some authentication technologies are able to determine the authentication content, some merely determines whether any alterations have occurred. A printed document bearing authentication barcode is said to be self-authenticating because no information other than what is on the printed document is required to authenticate its content.

SUMMARY

The present invention is directed to a method and related apparatus for encoding document authentication data in two-dimensional barcode stamps and placing the barcode stamps in a distributed manner across the page.

An object of the present invention is to efficiently utilize the space of a page to place barcode stamps.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for printing a document, which includes: obtaining a content of the document; segmenting the content of the document into a plurality of segments, at least some of the segments being paragraph segments each containing a paragraph of text content; for each paragraph segment: extracting text from the segment using optical character recognition; processing the extracted text to generate authentication data for the segment; encoding the authentication data into a set of one or more barcode stamps; and placing the set of barcode stamps in the document in a vicinity of the segment; and printing the content of the document and the sets of barcode stamps on a recording medium.

In another aspect, the present invention provides a method for printing a document, which includes: obtaining a content of the document; segmenting the content of the document into a plurality of segments, at least some of the segments being line segments each containing a line of text content; for each line segment: extracting text from the segment using optical character recognition; processing the extracted text to generate authentication data for the segment; encoding the authentication data into a set of one or more barcode stamps; and placing the set of barcode stamps in the document in a vicinity of the segment; and printing the content of the document and the sets of barcode stamps on a recording medium.

In another aspect, the present invention provides a computer program product that controls a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

To generate a self-authenticating document using 2d barcodes, a relatively large amount of data representing the content of the document must be encoded in the barcodes. The content of the document may include bitmap images, graphics, and text. The text may originate from the application that created the document, or extracted from images using optical character recognition (OCR) techniques. Existing methods of authenticating documents have used 2d barcodes having relatively large stamp sizes, such as 2 inches by 2 inches. Typical tile size recoverable after the closed-loop process span no less than 6 by 6 pixels (dots) at a resolution of 400 dpi (dots per inch). Here, barcode stamps refer to individual blocks each having well defined boundaries and constituting a barcode; tiles refer to the small black or white (or color) elements arranged in a defined pattern that collectively comprise a barcode stamp. Multiple barcode stamps are typically needed to encode the content of a page of document. For example, using 2 inches by 2 inches stamps at the above tile size, more than ten stamps may be required to encode the content of one typical page of document. Such stamps must be placed in a white (i.e. empty) area of the document where no document image exists. In most instances, there is insufficient white area on the document to print the stamps. It has been proposed to print the stamps on the backside of the document.

Embodiments of the present invention provide a document authentication method by which numerous small-sized 2d barcode stamps are generated and placed in a distributed manner on the printed document. In one particular example, the tile size for the stamps is 4 by 4 pixels at a resolution of 400 dpi, and the stamp size is 100 by 100 pixels, or about ¼ by ¼ inches. Each such stamp contains approximately 50 bytes of information. In another example, the stamp size is 50 by 50 pixels or about ⅛ by ⅛ inches with a tile size of 4 by 4 pixels. The document is segmented into a number or segments, each segment containing, for example, a paragraph of text, a line of text, a graphics object, an image object, etc., and 2d barcode stamps that encode authentication data for each segment are placed in a white space of the page in the vicinity of the segment.

Figure 1A:
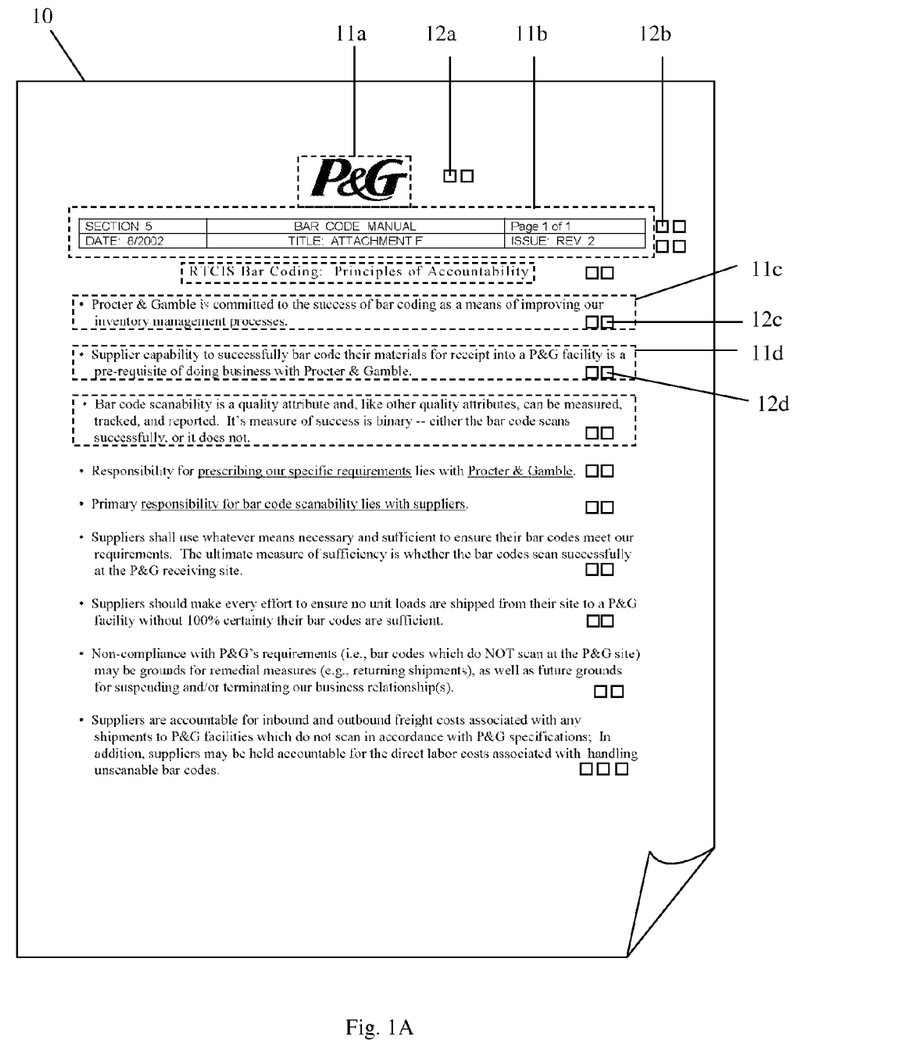
FIGS. 1A-1C schematically illustrate a printed document bearing 2d barcode stamps for document authentication according to embodiments of the present invention.

FIG. 1A schematically illustrates an example of such a page. As shown in FIG. 1A, the page of document 10 contains a content that includes a number of segments 11a, 11b, 11c, 11d, etc. In the illustrated example, the segment 11a contains a graphics object (a logo), the segment 11b contains a table with text, and the segments 11c and 11d contain text. A number of groups of small 2d barcode stamps 12a, 12b, 12c, 12d, etc. are printed on the page in a distributed manner, each group of barcode stamp encoding authentication data for a segment of the document. Each group contains one or more barcode stamps, which are preferably placed in the vicinity of the associated segment (i.e. the segment for which the group of barcode stamps encode the authentication data). For example, the group of barcode 12a, which encodes the authentication data for the segment 11a (the logo), is placed adjacent the segment 11a. The group of barcode 12c, which encodes the authentication data for the segment 11c (one paragraph of text), is placed in the white space in the last line of text of the paragraph, near the end of the line.

Figure 1B:
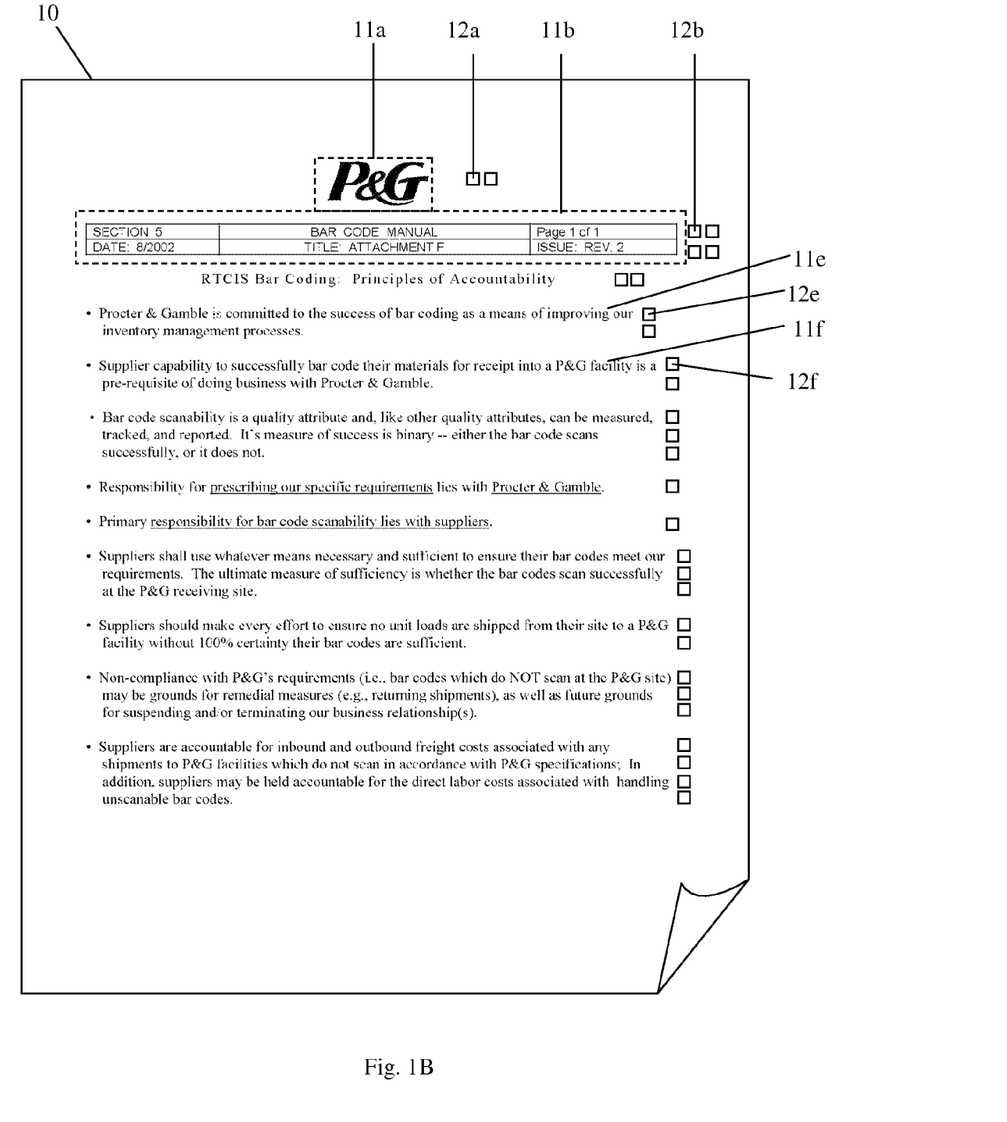
Figure 1C:
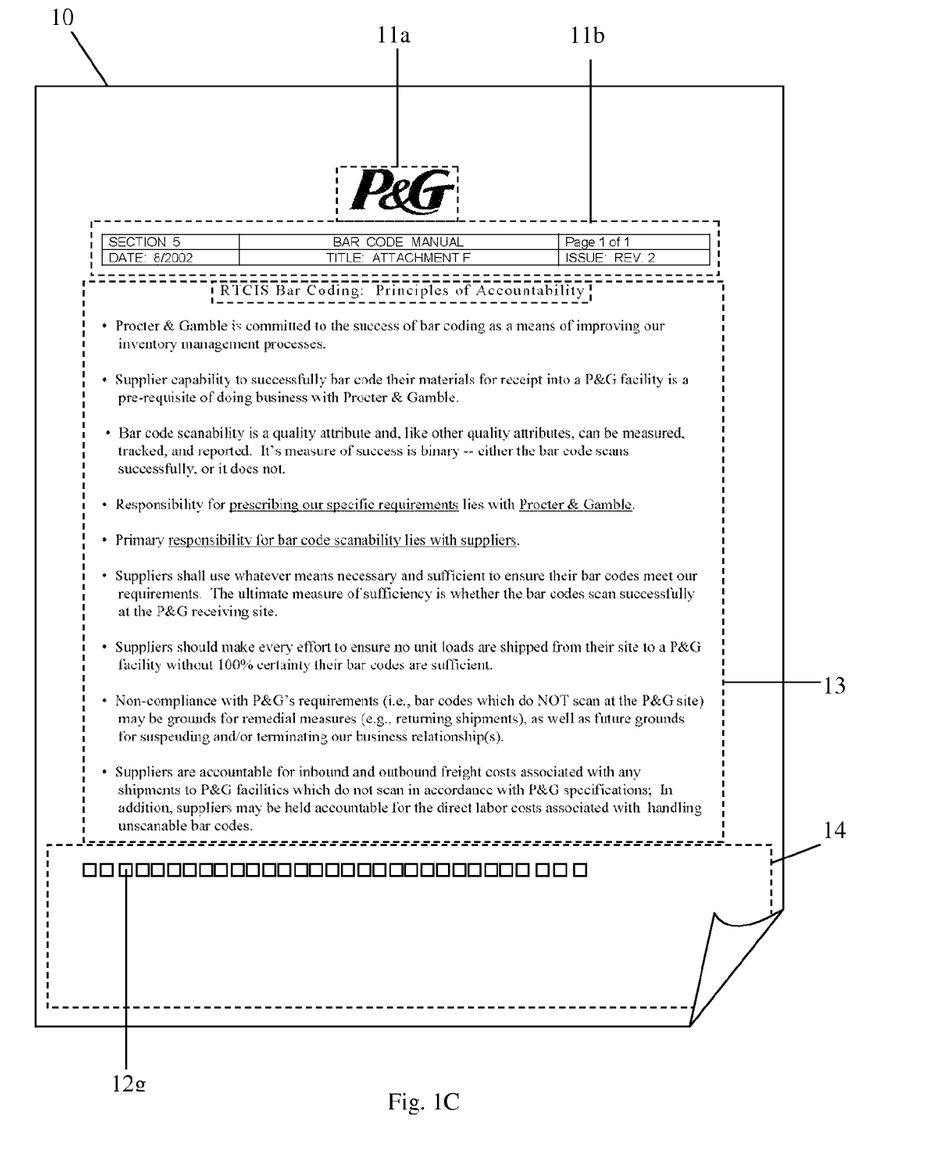

In another example (not shown), the barcode stamps for each paragraph of text are placed in the empty space between the paragraph and an adjacent paragraph. In another example, shown in FIG. 1B, the text objects of a document are segmented so that each line of text, such as 11e, 11f, etc., is a segment, and a group of one or more barcode stamps, such as 12e, 12f, etc., which encode the authentication data for a line, are placed next to the line, either at the beginning or the end of the line. Typically, if the authentication information is encoded as text (rather than a bitmap image of the text), one or two barcode having a size of about ¼ by ¼ inches and a tile size of 4 by 4 pixels at a 400 dpi resolution is sufficient to encode one line of text. In another example, when the text is compressed at a compression ratio of 75% or higher, one stamp having stamp size of be 50 by 50 pixels (approximately ⅛ by ⅛ inches) and a tile size of 4 by 4 pixels is sufficient to store the information for one line. In yet another example, even when the character size of the document is small (e.g. 10 points), two stamps having a stamp size of 36×36 pixels and a tile size of 4 by 4 pixels are generally sufficient to store the information for one line. The barcode stamps may also be placed in an empty space near the bottom of the page if such space is available, as shown in FIG. 1C, where barcode stamps 12g encoding all the text in the text object 13 are placed in the empty space 14. The barcode stamp layout patterns shown in FIGS. 1A-1C are merely examples. Other ways of distributing the barcode stamps on the page may be employed.

By using smaller stamp sizes, the tile size for the barcode stamps can be reduced. This is because the lower limit of the tile size is typically determined by distortions introduced in the printing and scanning process, such s skew. Reducing the barcode stamp size reduces the total amount of distortion across each stamp. As a result, the tile size can be reduced and information density increased. In the above examples, reducing the stamp size to about ¼ by ¼ inches allows the tile size to be reduced to 4 by 4 pixels from 6 by 6 pixels. A number of small barcode stamps combined generally have larger data storage capacity than a single large barcode stamp that encompasses the same physical size as the combined small barcode stamps.

In addition, small barcode stamps offer flexibility in stamp placement. By distributing the small-sized stamps in a layout pattern shown in FIGS. 1A-1C, or other suitable layout patterns, the white space in the document can be efficiently utilized. As a result, no or minimal (e.g. less than 20%) size reduction of the document image can be achieved. The distributed layout of small-sized barcode stamps also minimizes undesirable visual effect of large barcode stamps.

According to an embodiment of the present invention, a page of document is examined to estimate the amount of data to be encoded and the amount of empty space available on the page to place barcode stamps. A layout of the barcode stamps is then determined based on the amount of data to be encoded and the availability of empty space. If relatively large empty areas exist near the bottom or elsewhere of the page, the barcode stamps are placed in those empty areas, as shown in FIG. 1C. If no large empty areas are available to place the barcode stamps, the stamps are placed in a distributed manner on the page as shown in FIGS. 1A and 1B. Alternatively, the user may choose which layout pattern to use for placing barcode stamps.

Figure 2A:
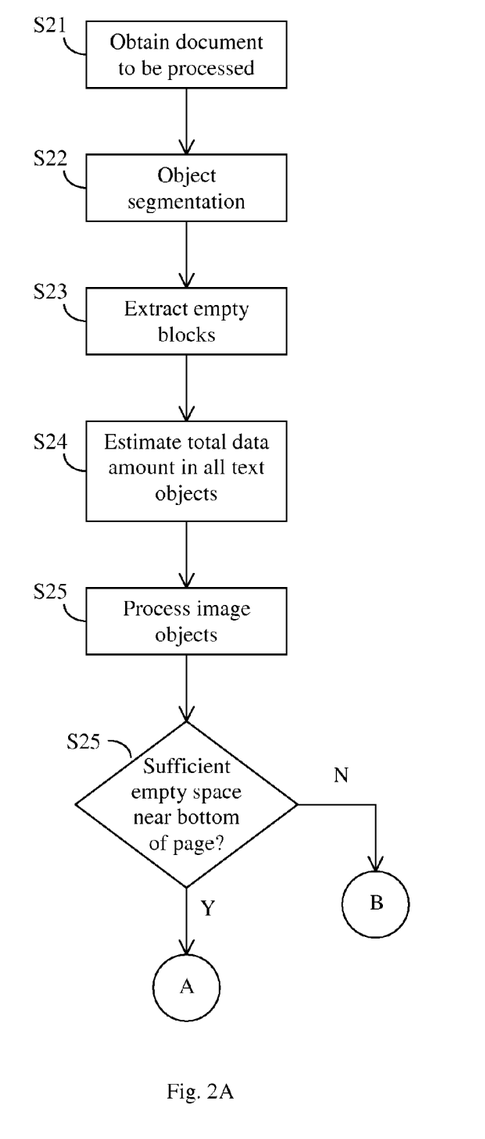
FIGS. 2A-2C illustrate a process of generating a printed document bearing 2d barcode stamps for document authentication.

A method of generating 2d barcode stamps for document authentication according to an embodiment of the present invention is described with reference to FIGS. 2A-2C. The method is typically implemented by software in a computer, printer or other data processing apparatus. As shown in FIG. 2A, the process first obtains the document to be processed (step S21). The document is typically in a bitmap format but can also be in other formats, and may originate from an application program such as a word processing application, a PDF writer application, etc., or from scanning a hard copy of a document. An object segmentation process is performed to obtain segments of the document (step S22). The segments contain content such as graphics, image or text, or empty areas on the page. In an example illustrated in FIG. 1C, the object segmentation step S22 results in an image object 11a, a table with text 11b, a text object 13, an empty block 14, etc. The document segmentation process can distinguish different types of objects, such as image, text, etc. Document segmentation is a known technique and its implementation is well within the capabilities of one skilled in the relevant art.

Next, the empty blocks on the page are extracted from the segmented document (step S23). The process also estimates the total data amount in all text objects on the page (step S24). The total amount of data may estimated by extracting text using OCR techniques (or other forms of character recognition techniques). Image objects on the page are processed separately from the text object (step S25); various methods may be used to process the image and graphic objects, as will be described later. Based on the estimate of total data amount and the amount of empty space, the process determines whether there is sufficient empty space near the bottom of the page to place barcode stamps for encoding authentication data (step S26). If there is ("Y" in step S26), barcode stamps are generated and placed in the empty space near the bottom of the page in a first process (FIG. 2B). If there is insufficient space near the bottom of the page to place the barcode stamps, barcode stamps are generated and placed throughout the page in a second process (FIG. 2C).

Figure 2B:
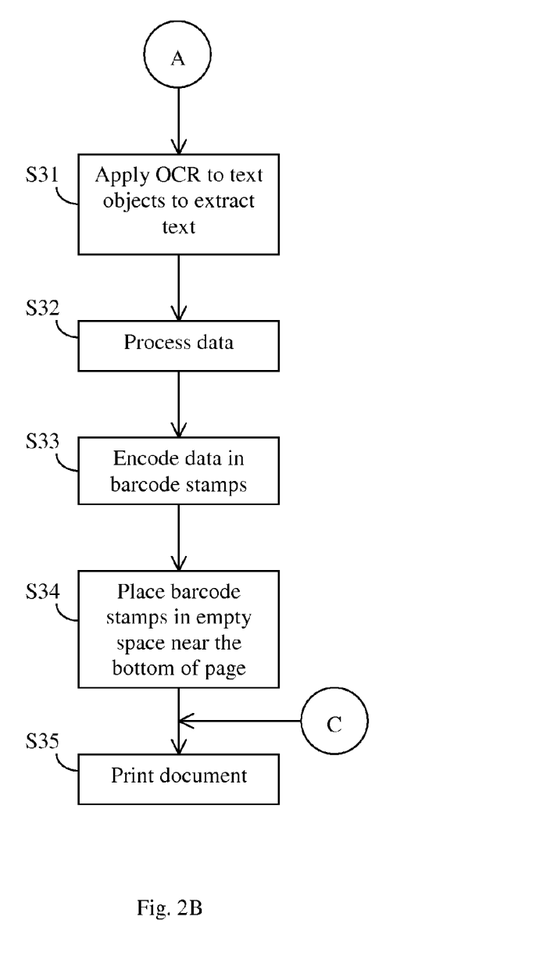

In the first process, shown in FIG. 2B, an OCR technique (or other forms of character recognition techniques) is applied to the text objects to extract the text contained therein (step S31). The extracted text is processed to generate authentication data (step S32), which is then encoded into barcode stamps (step S33). The processing step S32 includes compression, and may optionally include encryption, digital signature, or other processing. The barcode stamps are placed in a block of empty space, e.g., the empty space near the bottom of the page (step S34), and the document is printed (step S35). The resulting printed document may resemble the example shown in FIG. 1C.

An alternative implementation of the first process may be employed if the document has a complicated layout. Under this alternative, paragraph segmentation is carried out before the OCR step S31 to segment the text object further into paragraph segments each containing a paragraph of text. The OCR step S31 is then performed for each paragraph segment. An advantage of paragraph segmentation is that it provides information regarding the position of the text on the page, whereas the OCR technique applied to a large text object generally does not give information about where the text is. The barcode stamps additionally encode the position of the paragraph segments so that they can be correctly associated with the segments during the decoding process.

Figure 2C:
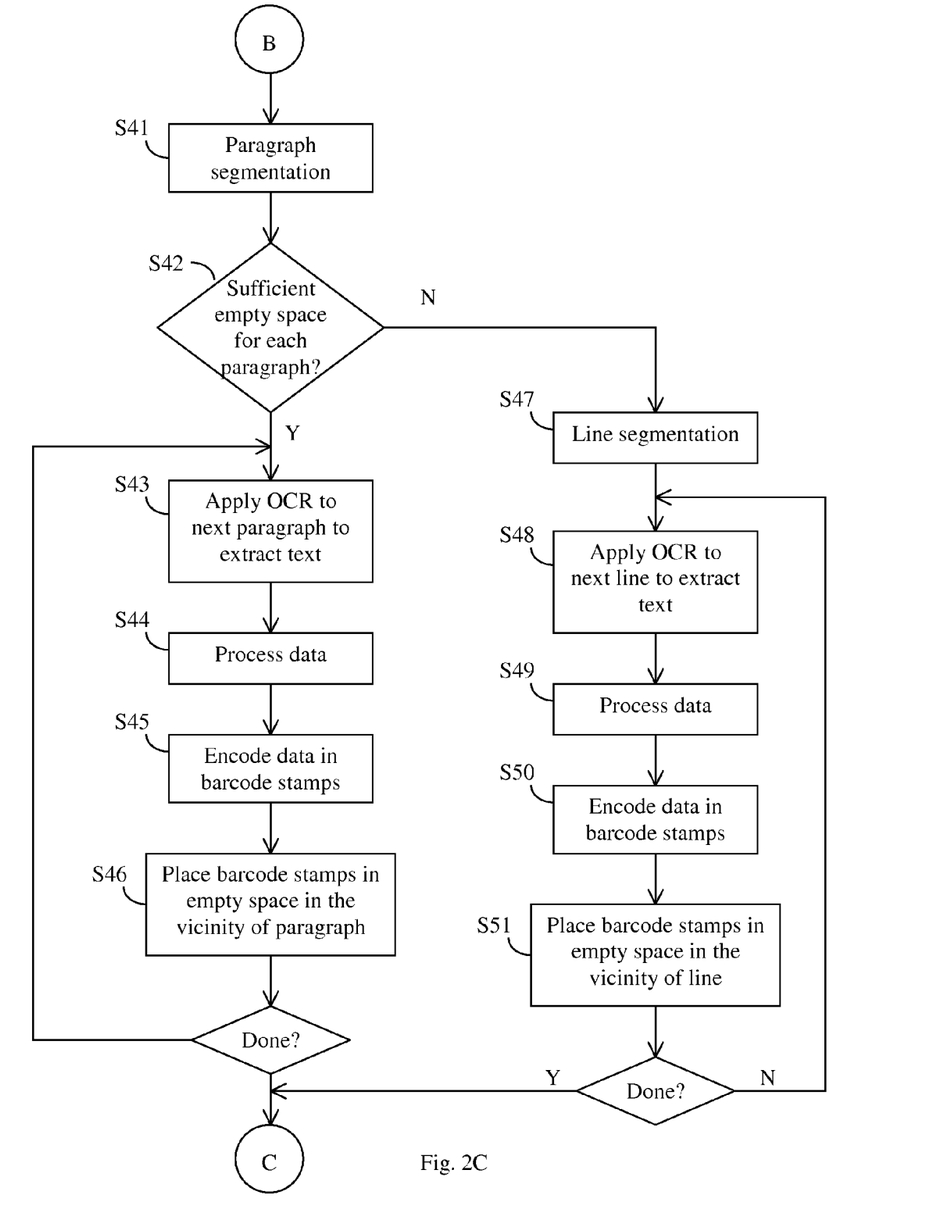

In the second process, shown in FIG. 2C, paragraph segmentation is performed to segment the text objects further into paragraphs segments that contain individual paragraphs (step S41). In the example of FIG. 1A, the paragraph segments are shown as 11c, 11d, etc. The positions of the paragraph segments are recorded. The position may be measured, for example, from the upper left hand corner of the page. The process then determines whether there is sufficient empty space in the vicinity of each paragraph to place the barcode stamps (step S42). In this step, the process looks for empty spaces either in the last line of each paragraph, if the line is not fully occupied by the paragraph, or in the space between adjacent paragraphs, if the document is formatted such that spaces are present between adjacent paragraphs. If there is sufficient space in the vicinity of each paragraph ("Y" in step S42), a paragraph-by-paragraph encoding process is carried out (steps S43-S46). Specifically, for each paragraph, an OCR technique (or other forms of character recognition techniques) is applied to each extract the text (step S43), the extracted text data is processed to generate authentication data for that paragraph (step S44), and the authentication data is encoded into barcode stamps (step S45). The processing step includes compression, and may optionally include encryption, digital signature, or other processing. The barcode stamps for each paragraph are placed in the empty space in the vicinity of that paragraph (step S46). Steps S43 to S46 are repeated for each paragraph. The resulting printed document may resemble the example shown in FIG. 1A.

If there is insufficient space in the vicinity of each paragraph ("N" in step S42), a line-by-line encoding process is carried out (steps S47-S51). Specifically, line segmentation is performed to segment the paragraph segments further into line segments each containing a line of text (step S47). An OCR technique (or other forms of character recognition techniques) is applied to each line to extract the text (step S48), and the extracted text data is processed to generate authentication data for that line (step S49). The processing step includes compression, and may optionally include encryption and digital signature. The authentication data is encoded into barcode stamps for each line (step S50), which are placed in the vicinity of that line (step S51), such as at the beginning or end of the line. Steps S48 to S51 are repeated for each line. The resulting printed document may resemble the example shown in FIG. 1B (note that in FIG. 1B a line-by-line process is shown for illustrative purpose even though there is sufficient space to place barcodes on a paragraph-by-paragraph basis).

Referring back to step S25 in FIG. 2A, image objects contained in the document is processed separately from the text objects. Image objects typically contain a larger amount of data than text objects. Images may be down-sampled and compressed to reduce the data amount. If an image is sufficiently small, the authentication data may be encoded in barcode stamps and placed in the vicinity of the image. If the image is large or there is no available empty space near the image, the barcode stamps may be placed elsewhere on the page, e.g., near the bottom of the page.

Figure 3:
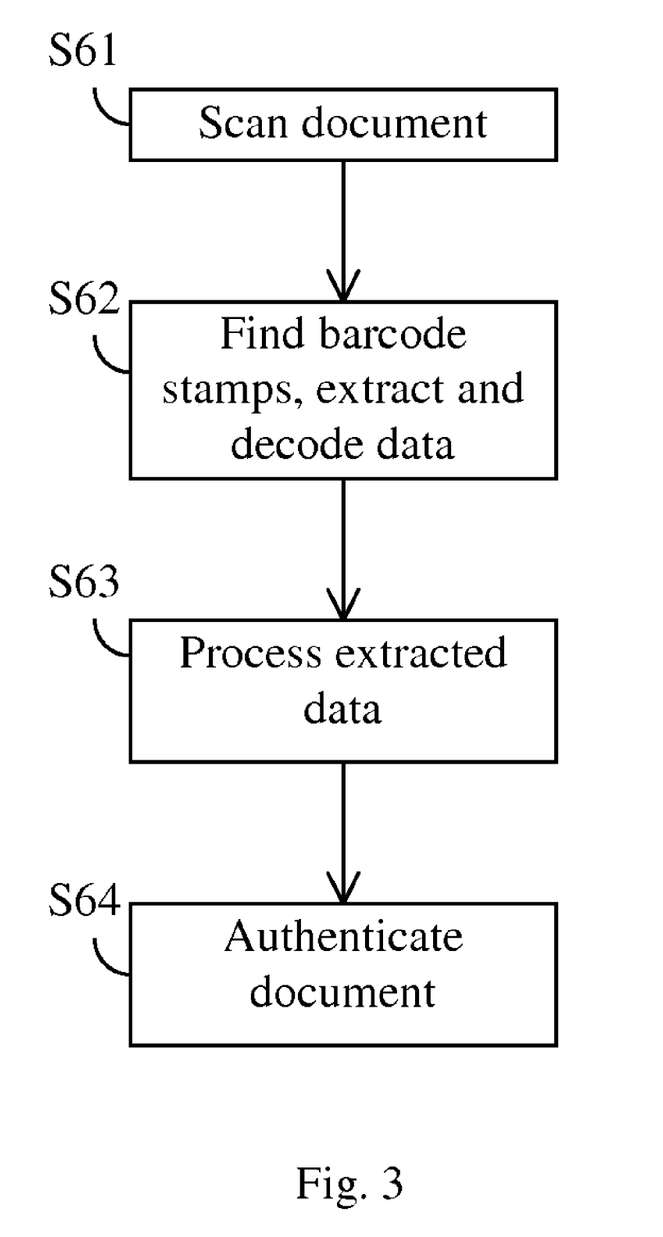
FIG. 3 illustrates a process for scanning a printed document bearing 2d barcode stamps and authenticating the document.

In the authenticating process, shown in FIG. 3, the document is scanned (step S61), and the barcode stamps are identified and the data encoded therein is extracted and decoded (step S62). The data is processed (step S63), including decryption (optional), digital signature verification (optional), decompression, etc. The processed data is used to authenticate the document (step S64). The process of authenticating a document using extracted data is generally known to those skilled in the relevant art and a more detailed description is omitted here.

It will be apparent to those skilled in the art that various modification and variations can be made in the barcode creation and placement method of the present invention without departing from the spirit or scope of the invention. Thus, it is intended that the present invention cover modifications and variations that come within the scope of the appended claims and their equivalents.

What is claimed is:
1. A method for printing a document, comprising:
obtaining a content of the document;
segmenting the content of the document into a plurality of segments, at least some of the segments being paragraph segments each containing a paragraph of text content;
for each paragraph segment:
extracting text from the segment using character recognition;
processing the extracted text to generate authentication data for authenticating the text content in the segment;
encoding the authentication data into a set of one or more barcode stamps; and
placing the set of barcode stamps in the document in a vicinity of the segment; and
printing the content of the document and the sets of barcode stamps on a recording medium.

2. The method of claim 1, wherein each barcode stamp has a stamp size of no larger than about ¼ by ¼ inches and a tile size of 4 by 4 pixels at a resolution of 400 dots per inch.

3. The method of claim 1, wherein the set of barcode stamps for each paragraph segment is placed in an empty space in a last line of the paragraph.

4. The method of claim 1, wherein the set of barcode stamps for each paragraph segment is placed in an empty space between the paragraph and an adjacent paragraph.

5. The method of claim 1, wherein the content of the document is printed without size reduction.

6. The method of claim 1, further comprising:
scanning the printed document having the sets of barcode stamps;
extracting and decoding the authentication data encoded in the barcode stamps; and
authenticating the scanned document using the authentication data.

7. A method for printing a document, comprising:
obtaining a content of the document;
segmenting the content of the document into a plurality of segments, at least some of the segments being line segments each containing a line of text content;
for each line segment:
extracting text from the segment using character recognition;
processing the extracted text to generate authentication data for the segment;
encoding the authentication data into a set of one or more barcode stamps; and
placing the set of barcode stamps in the document in a vicinity of the segment; and
printing the content of the document and the sets of barcode stamps on a recording medium.

8. The method of claim 7, wherein each barcode stamp has a stamp size of no larger than about ¼ by ¼ inches and a tile size of 4 by 4 pixels at a resolution of 400 dots per inch.

9. The method of claim 7, wherein the set of barcode stamps for each line segment is placed near a beginning or an end of the line.

10. The method of claim 7, wherein the content of the document is printed without size reduction.

11. The method of claim 7, further comprising:
scanning the printed document having the sets of barcode stamps;
extracting and decoding the authentication data encoded in the barcode stamps; and
authenticating the scanned document using the authentication data.

12. A computer program product comprising a non-transitory computer usable medium having a computer readable code embodied therein for controlling a data processing apparatus, the computer readable program code configured to cause the data processing apparatus to execute a process for printing a document comprising the steps of:
obtaining a content of the document;
segmenting the content of the document into a plurality of segments, at least some of the segments being paragraph segments each containing a paragraph of text content;
for each paragraph segment:
extracting text from the segment using character recognition;
processing the extracted text to generate authentication data for authenticating the text content in the segment;
encoding the authentication data into a set of one or more barcode stamps; and
placing the set of barcode stamps in the document in a vicinity of the segment; and
printing the content of the document and the sets of barcode stamps on a recording medium.

13. The computer program product of claim 12, wherein each barcode stamp has a stamp size of no larger than about ¼ by ¼ inches and a tile size of 4 by 4 pixels at a resolution of 400 dots per inch.

14. The computer program product of claim 12, wherein the set of barcode stamps for each paragraph segment is placed in an empty space in a last line of the paragraph.

15. The computer program product of claim 12, wherein the set of barcode stamps for each paragraph segment is placed in an empty space between the paragraph and an adjacent paragraph.

16. The computer program product of claim 12, wherein the process further comprises:
scanning the printed document having the sets of barcode stamps;
extracting and decoding the authentication data encoded in the barcode stamps; and
authenticating the scanned document using the authentication data.

17. A computer program product comprising a non-transitory computer usable medium having a computer readable code embodied therein for controlling a data processing apparatus, the computer readable program code configured to cause the data processing apparatus to execute a process for printing a document comprising the steps of:
obtaining a content of the document;
segmenting the content of the document into a plurality of segments, at least some of the segments being line segments each containing a line of text content;
for each line segment:
extracting text from the segment using character recognition;
processing the extracted text to generate authentication data for the segment;
encoding the authentication data into a set of one or more barcode stamps; and
placing the set of barcode stamps in the document in a vicinity of the segment; and
printing the content of the document and the sets of barcode stamps on a recording medium.

18. The computer program of claim 17, wherein each barcode stamp has a stamp size of no larger than about ¼ by ¼ inches and a tile size of 4 by 4 pixels at a resolution of 400 dots per inch.

19. The computer program product of claim 17, wherein the set of barcode stamps for each line segment is placed near a beginning or an end of the line.

20. The computer program product of claim 17, wherein the process further comprises:
scanning the printed document having the sets of barcode stamps;
extracting and decoding the authentication data encoded in the barcode stamps; and
authenticating the scanned document using the authentication data.

21. A method for printing a document, comprising:
obtaining a content from the document;
segmenting the document content into a plurality of segments, at least some of the segments each containing at least one object;
for each segment:
extracting information from the at least one object of the segment;

processing the extracted information to generate authentication data for authenticating the at least one object of the segment;

encoding the authentication data into a set of one or more barcode stamps; and placing the set of barcode stamps in the document in a vicinity of the segment; and printing the document content and the sets of barcode stamps on a recording medium.

22. The method of claim 21, wherein each barcode stamp has a stamp size of no larger than about ¼ by ¼ inches and a tile size of 4 by 4 pixels at a resolution of 400 dots per inch.

23. The method of claim 21, wherein the set of barcode stamps for each segment is placed near the bottom of each page of the document.

24. The method of claim 21, wherein the document content is printed without size reduction.

25. The method of claim 21, further comprising:

scanning the printed document having the sets of barcode stamps;

extracting and decoding the authentication data encoded in the barcode stamps; and authenticating the scanned document using the authentication data.

26. A computer program product comprising a non-transitory computer usable medium having a computer readable code embodied therein for controlling a data processing apparatus, the computer readable program code configured to cause the data processing apparatus to execute a process for printing a document comprising the steps of:

obtaining a content from the document;

segmenting the document content into a plurality of segments, at least some of the segments each containing at least one object;

for each segment:

extracting information from the at least one object of the segment;

processing the extracted information to generate authentication data for authenticating the at least one object of the segment;

encoding the authentication data into a set of one or more barcode stamps; and placing the set of barcode stamps in the document in a vicinity of the segment; and printing the document content and the sets of barcode stamps on a recording medium.

27. The computer program product of claim 26, wherein each barcode stamp has a stamp size of no larger than about ¼ by ¼ inches and a tile size of 4 by 4 pixels at a resolution of 400 dots per inch.

28. The computer program product of claim 26, wherein the set of barcode stamps for each segment is placed near the bottom of each page of the document.

29. The method of claim 26, wherein the document content is printed without size reduction.

30. The computer program product of claim 26, wherein the process further comprises:

scanning the printed document having the sets of barcode stamps;

extracting and decoding the authentication data encoded in the barcode stamps; and authenticating the scanned document using the authentication data.

\* \* \* \* \*